(12) United States Patent
Dzikiewicz et al.

(10) Patent No.: US 7,305,385 B1
(45) Date of Patent: Dec. 4, 2007

(54) N-GRAM BASED TEXT SEARCHING

(75) Inventors: Joseph Dzikiewicz, Alexandria, VA (US); Stuart L. Brandt, Ashburn, VA (US)

(73) Assignee: AOL LLC, Dulles, VA (US)

( * ) Notice: Subject to any disclaimer, the term of this patent is extended or adjusted under 35 U.S.C. 154(b) by 406 days.

(21) Appl. No.: 11/023,650

(22) Filed: Dec. 29, 2004

Related U.S. Application Data

(60) Provisional application No. 60/608,511, filed on Sep. 10, 2004.

(51) Int. Cl.
*G06F 17/30* (2006.01)
*G06F 7/00* (2006.01)

(52) U.S. Cl. .................. 707/3; 707/5; 707/6

(58) Field of Classification Search ............ 707/1–7, 707/9, 10, 100–102, 104.1, 200; 715/500; 704/9
See application file for complete search history.

(56) References Cited

U.S. PATENT DOCUMENTS

| | | | | |
|---|---|---|---|---|
| 5,261,009 A | * | 11/1993 | Bokser | 382/230 |
| 5,706,365 A | * | 1/1998 | Rangarajan et al. | 707/102 |
| 6,157,905 A | * | 12/2000 | Powell | 704/2 |
| 6,311,183 B1 | * | 10/2001 | Cohen | 707/6 |
| 6,658,151 B2 | * | 12/2003 | Lee et al. | 382/229 |
| 7,184,949 B2 | * | 2/2007 | Kurzweil et al. | 704/9 |
| 2006/0041521 A1 | * | 2/2006 | Oral et al. | 707/1 |
| 2006/0059123 A1 | * | 3/2006 | Klein | 707/3 |

OTHER PUBLICATIONS

Ari Pirkola et al.: Fuzzy Translation of Cross lingual Spelling Variants, Aug. 2003, ACM Press, pp. 345-352.*

Claudia Pearce et al.:Generating a Dynamic Hypertext Environment with n-gram Analysis, Mar. 1993, ACM Press, pp. 148-153.*

Roy E. Kimbrell: Searching for Text? Send an N-Gram!, May 1988, McGraw-Hill, vol. 13, issue 5, pp. 297-312.*

Yochum, Julian A., "A High-Speed Text Scanning Algorithm Utilizing Least Frequent Trigraphs" IEEE International Symposium on New Directions in Computing, Trondheim, Norway, Aug. 12-14, 1985, pp. 114-121.

Adams et al., Elizabeth S., "Trigrams as Index Elements in Full Text Retrieval Observations and Experimental Results"ACM, 1993, pp. 433-439.

Ogawa et al., Yasushi, "An efficient document retrieval method using n-gram indexing" Wiley InterScience, (abstract only), available at http://www3.interscience.wiley.com/cgi-bin/abstract/89014071/ABSTRACT.

Cavnar, William B., "Using An N-Gram-Based Document Representation with a Vector Processing Retrieval Model," TREC 3, Nov. 2-4, 1994.

Miller, Ethan et al., "Techniques for Gigabyte-Scale N-gram Based Information Retrieval on Personal Computers", 1999 International Confrence on Parrallel and Distributed Processing Techniques and Applications, Las Vegas, NV, Jun. 1999.

Miller, Ethan et al., "Performance and Scalability of a Large-Scale N-gram Based Information Retrieval System", Journal of Digital Information, vol. 1, Issue 5, Jan. 2000.

* cited by examiner

*Primary Examiner*—Jeffrey Gaffin
*Assistant Examiner*—Jacques Veillard
(74) *Attorney, Agent, or Firm*—Fish & Richardson P.C.

(57) ABSTRACT

N-грamsare used to identify documents that potentially satisfy a search query. The documents that potentially satisfy the query are then searched (e.g., using a full text search) to determine which documents actually satisfy the query.

22 Claims, 11 Drawing Sheets

| String 1 |   | A | B | C | D | E |
|---|---|---|---|---|---|---|
|   | 0 | 0 | 0 | 0 | 0 | 1 |
| A | 0 | 0 | 0 | 1 | 0 | 0 |
| B | 0 | 0 | 0 | 0 | 0 | 0 |
| C | 1 | 0 | 0 | 0 | 0 | 0 |
| D | 0 | 0 | 0 | 0 | 0 | 0 |
| E | 0 | 0 | 0 | 0 | 0 | 0 |

Figure 5A

|   | String 1 | String 2 | String 3 |
|---|---|---|---|
| Trigram _CA | 1 | 0 | 1 |

Figure 5B

N-GRAM BASED TEXT SEARCHING

CLAIM OF PRIORITY

This application claims priority under 35 USC § 119(e) to U.S. Provisional Patent Application Ser. No. 60/608,511, filed on Sep. 10, 2004, which is hereby incorporated by reference.

TECHNICAL FIELD

This invention relates to N-gram based document retrieval.

BACKGROUND

A document dissemination system is generally designed to run multiple text queries against a single document, where each query is entered by a different user. The document is then presented to those users whose text queries were satisfied by the document. In contrast, a document retrieval system is generally designed to run a text query against a large database of documents. The documents that satisfy the text query are then presented to the user who entered the query.

To run a query against a large database of documents, a document retrieval system generally has three major components: an index, an indexing process, and a search process. The index is a representation of the searchable documents and is used to search the documents. The indexing process constructs the index and the search process uses the index to identify the documents that match a query.

Typically, a system with a more complex index is more efficient at search-time, but requires more processing to construct the index. Such a system is more efficient for an application with many more searches than indexing operations, while a system with a simpler index is more efficient if there are fewer searches relative to the number of indexing operations.

SUMMARY

In general, a document retrieval system maintains an index of documents that associates each document with N-grams contained in the document. When a query containing a query string is received, the N-grams contained in the query string are determined. A group of documents that potentially satisfy the query are determined by using the index to determine documents that contain the N-grams in the query string. The documents in the group are then searched for the query string.

Implementations may include one or more of the following features. For example, the documents may be e-mails. The search for the query string in the documents of the group may identify a document in the group that contains the query string and that document may be indicated, for example, to a user.

The index may include multiple bitmaps, with each bitmap representing a different document and indicating the presence of the one or more N-grams in the document represented by the bitmap. Alternatively, or additionally, each bitmap may represent a different N-gram and indicate different documents containing the N-gram represented by the bitmap.

The index may associate each document with 0-offset N-grams contained in the document and M-offset N-grams (where M>0) contained in the document. In this case, 0-offset N-grams contained in the query string and M-offset N-grams (where M>0) contained in the query string may be determined and the index may be used to identify a group of documents that contain the 0-offset N-grams contained in the query string and the M-offset N-grams contained in the query strings as potentially satisfying the query.

The N-grams may be digrams or trigrams. For instance, the N-grams may be digrams such that the index is a digram index that associates each document with digrams contained in the document. As documents are received, they may be indexed in the digram index by adding a record to the digram index, with the record associating the document with the digrams in the document. The digram index may be used to identify documents that potentially match queries until the documents are indexed using another indexing system. For example, the digram index may be used until the number of received documents reaches a threshold. When the number of received documents reaches the threshold, the trigrams contained in the received documents may be determined and used to generate a trigram index. The trigram index may be used to identify documents that potentially match received queries by determining documents that contain trigrams in a query string. Those identified documents then may be searched for the query string. A digram index may be generated for newly received documents and used to identify documents from the newly received documents that potentially match a query.

In another example, the record for a received document may be included in the digram index until the document can be indexed in a second index, such as an inverted file index. When the document is indexed in the second index, the record may be removed from the digram index.

Implementations of the described techniques may include hardware, a method or process, and computer software on a computer-accessible medium.

The details of one or more implementations are set forth in the accompanying drawings and the description below. Other features will be apparent from the description and drawings, and from the claims.

DESCRIPTION OF DRAWINGS

FIGS. 5A and 5B illustrates examples of document N-gram bitmaps.

DETAILED DESCRIPTION

Figure 1:
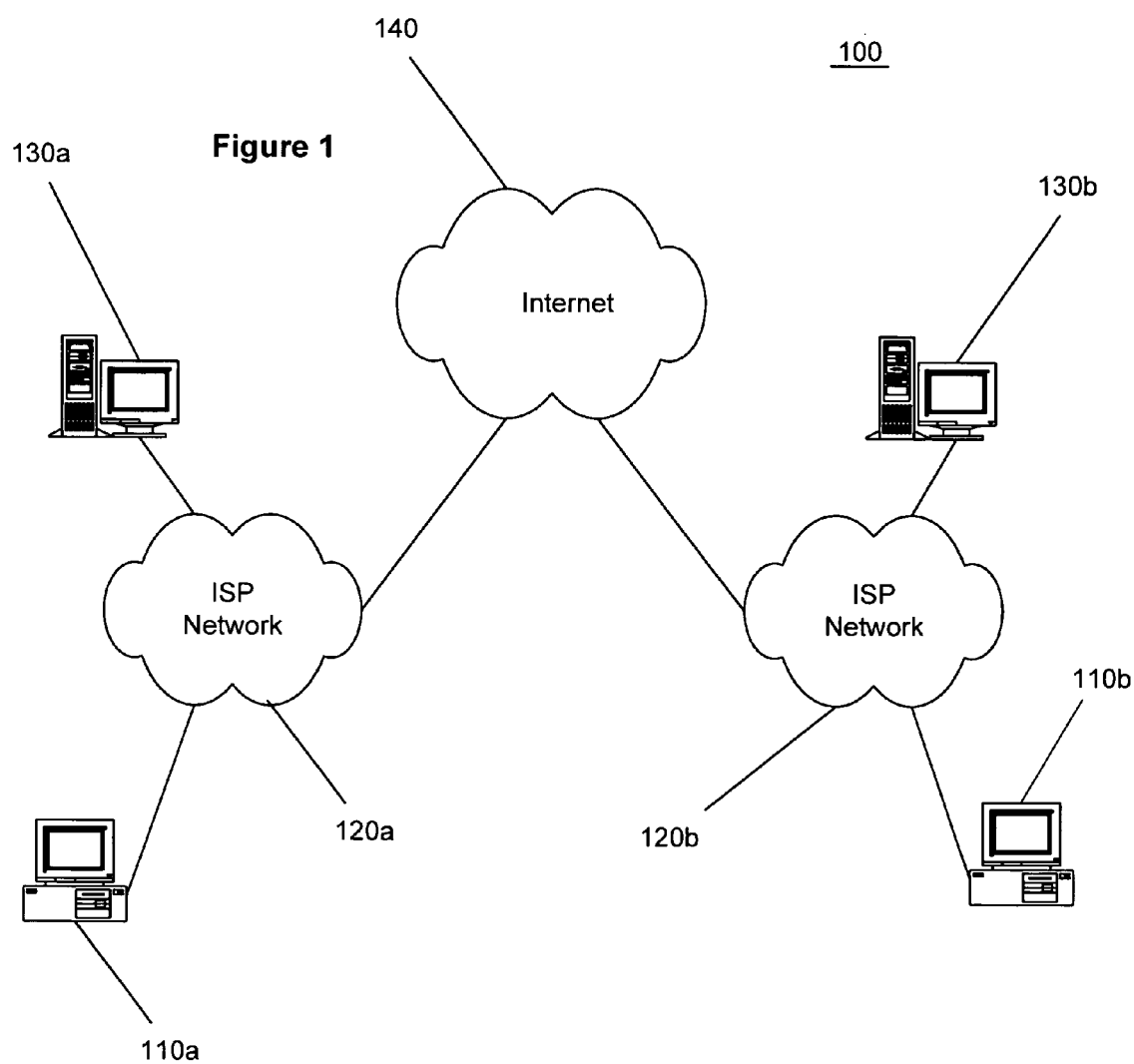
FIG. 1 is a diagram that illustrates an example of a networked computing environment that supports e-mail communications and in which text searching of e-mails may be performed.

Generally, N-grams (i.e., N character sequences) are used to identify documents that potentially satisfy a search query. The documents that potentially satisfy the query are then searched (e.g., using a full text search) to determine which documents actually satisfy the query.

For example, for a set of documents, the digrams (or, in other implementations, other N-grams) in each document may be determined. Digrams are the two-character sequences in the document. For example, in the word "CAT," the digrams are (including leading and trailing spaces): "_C," "CA," "AT," "T_." The characters included in the digrams may be limited to alphanumeric characters and spaces, and the characters may be normalized by converting lower-case characters to upper-case characters and punctuation to spaces. A document bitmap created for each document may contain 1 bit for each possible digram. If a digram is in the document, the corresponding bit is set, and if a digram is not in the document, the corresponding bit is cleared.

Upon receiving a search query that includes a query string, the digrams in the query string may be determined and a query digram bitmap that indicates the digrams in the query string may be created. The document bitmap for each document then may be retrieved and the query bitmap compared to the document bitmap. If all of the digrams in the query string are contained in a document bitmap, then the corresponding document is a potential match. A full text search then may be performed on the resulting potential matches, i.e., the words in the potential matches are searched for the query strings.

Using N-grams to identify documents that potentially contain the query string or strings in a search query and then searching the potential matches may be more efficient than using inverted file or other text searching techniques for certain applications, such as a host-based e-mail search application.

In general, a host-based mail search application has the following characteristics. First, the number of incoming messages is large (e.g., on the order of 4000 per second). While all of those messages generally should be searchable in the short term, a large percentage (e.g., 80%) will not be viewed and thus are neither stored nor searchable in the long term. Second, the number of searches is most likely one or more orders of magnitude lower than the number of incoming messages. Lastly, to be compliant with some standards (e.g. the IMAP standard) substrings should be searched. For example, a query for "PUT" should find a document containing the word "COMPUTER".

A traditional inverted file text search system optimizes search speed by doing significant processing at index time. This is appropriate when the number of searches is high compared to the number of index events, since system efficiency results from amortizing the indexing costs over all searches. An index event is either the addition or deletion of a document from the index. However, this is less appropriate for a system with characteristics such as those noted above for a host-based mail search application because:

Messages that are only searchable in the short term need to be deleted from the index. Deletes are as costly as indexes in an inverted file system.

The proportion of new documents to searches is much larger than in typical text databases, such that costs of indexing cannot be amortized over as many searches. In other words, there is a relatively low ratio of searches-performed to documents-indexed.

Inverted file systems cannot easily support substring searches.

More generally, other text search applications may benefit from using the described techniques, particularly if those applications experience a relatively low ratio of searches-performed to documents indexed. Thus, while the following text and figures describe the techniques as being applied to an e-mail search application, the described techniques may be used in other text search applications.

FIG. 1 illustrates an example of a networked computing environment 100 that supports e-mail communications and in which text searching of e-mails may be performed. Computer users may be distributed geographically and may communicate using client systems 110a and 110b. Client systems 110a and 110b are connected to ISP networks 120a and 120b, respectively. While illustrated as ISP networks, networks 120a or 120b may be of any network type, such as, for example, a corporate network. Clients 110a and 110b may be connected to the respective ISP networks 120a and 120b through various communication channels, such as a modem connected to a telephone line (using, for example, serial line internet protocol (SLIP) or point-to-point protocol (PPP)) or a direct network connection (using, for example, transmission control protocol/internet protocol (TCP/IP)). E-mail or other messaging servers 130a and 130b also are connected to ISP networks 120a and 120b, respectively. ISP networks 120a and 120b are connected to a global network 140 (e.g., the Internet) such that a device on one ISP network can communicate with a device on the other ISP network. For simplicity, only two ISP networks 120a and 120b have been illustrated as connected to Internet 140. However, there may be a large number of such ISP or other networks connected to Internet 140. Likewise, many e-mail servers and many client systems may be connected to each ISP network.

Each of the client systems 110a and 110b and e-mail servers 130a and 130b may be implemented using, for example, a general-purpose computer capable of responding to and executing instructions in a defined manner, a personal computer, a special-purpose computer, a workstation, a server, a device such as a personal digital assistant (PDA), a component, or other equipment or some combination thereof capable of responding to and executing instructions. Client systems 110a and 110b and e-mail servers 130a and 130b may receive instructions from, for example, a software application, a program, a piece of code, a device, a computer, a computer system, or a combination thereof, which independently or collectively direct operations. These instructions may take the form of one or more communications programs that facilitate communications between the users of client systems 110a and 110b. Such communications programs may include, for example, e-mail programs, IM programs, file transfer protocol (FTP) programs, or voice-over-IP (VoIP) programs. The instructions may be embodied permanently or temporarily in any type of machine, component, equipment, storage medium, or propagated signal that is capable of being delivered to a client system or an e-mail server.

Each of client systems 110a and 110b and e-mail servers 130a and 130b includes a communications interface (not shown) used by the communications programs to send communications. The communications may include e-mail, audio data, video data, general binary data, or text data (e.g., data encoded in American Standard Code for Information Interchange (ASCII) format or Unicode).

Examples of ISP networks 120a and 120b include Wide Area Networks (WANs), Local Area Networks (LANs), analog or digital wired and wireless telephone networks (e.g., a Public Switched Telephone Network (PSTN), an Integrated Services Digital Network (ISDN), or a Digital Subscriber Line (xDSL)), or any other wired or wireless network including, for example, a corporate LAN or WAN. Networks 120a and 120b may include multiple networks or subnetworks, each of which may include, for example, a wired or wireless data pathway.

Each of e-mail servers 130a and 130b may handle e-mail for users connected to ISP network 120a or 120b. Each e-mail server may handle e-mail for a single e-mail domain (e.g., aol.com), for a portion of a domain, or for multiple e-mail domains. While not shown, there may be multiple, interconnected e-mail servers working together to provide e-mail service.

An e-mail user, such as a user of client system 110a or 110b, typically has one or more e-mail mailboxes on an e-mail system, which may incorporate e-mail server 130a or 130b. Each mailbox corresponds to an e-mail address. Each mailbox may have one or more folders in which e-mail is stored. E-mail sent to one of the e-mail user's e-mail addresses is routed to the corresponding e-mail server 130a or 130b and placed in the mailbox that corresponds to the e-mail address to which the e-mail was sent. The e-mail user then uses, for example, an e-mail client program executing on client system 110a or 110b to retrieve the e-mail from e-mail server 130a or 130b and view the e-mail.

In one implementation, long term storage of the retrieved e-mail is performed on client system 110a or 110b. In this case, the e-mail client program may retrieve the e-mail from e-mail server 130a or 130b, store the e-mail locally for long-term storage, and cause e-mail server 130a or 130b to delete the e-mail from storage on e-mail server 130a or 130b. For example, if the e-mail client application and the e-mail server 130a or 130b implement the post office protocol 3 (POP3), then, generally, long-term storage of the e-mail is performed on client system 110a or 110b.

In another implementation, long-term storage of the e-mail is performed on e-mail server 130a or 130b. The e-mail client application retrieves and temporarily stores or caches the e-mail on client system 110a or 110b while the e-mail is being viewed or for a short time thereafter. For example, if the e-mail client application and e-mail server 130a or 130b implement the Internet message access protocol (IMAP), then, generally, long-term storage of the e-mail is performed on e-mail server 130a or 130b.

In another implementation, long term storage of the retrieved e-mail is performed on both client system 110a or 110b and e-mail server 130a or 130b. For example, both POP3 and IMAP provide mechanisms that allow long-term storage of e-mail to be performed on both client system 110a or 110b and e-mail server 130a or 130b.

Figure 2:
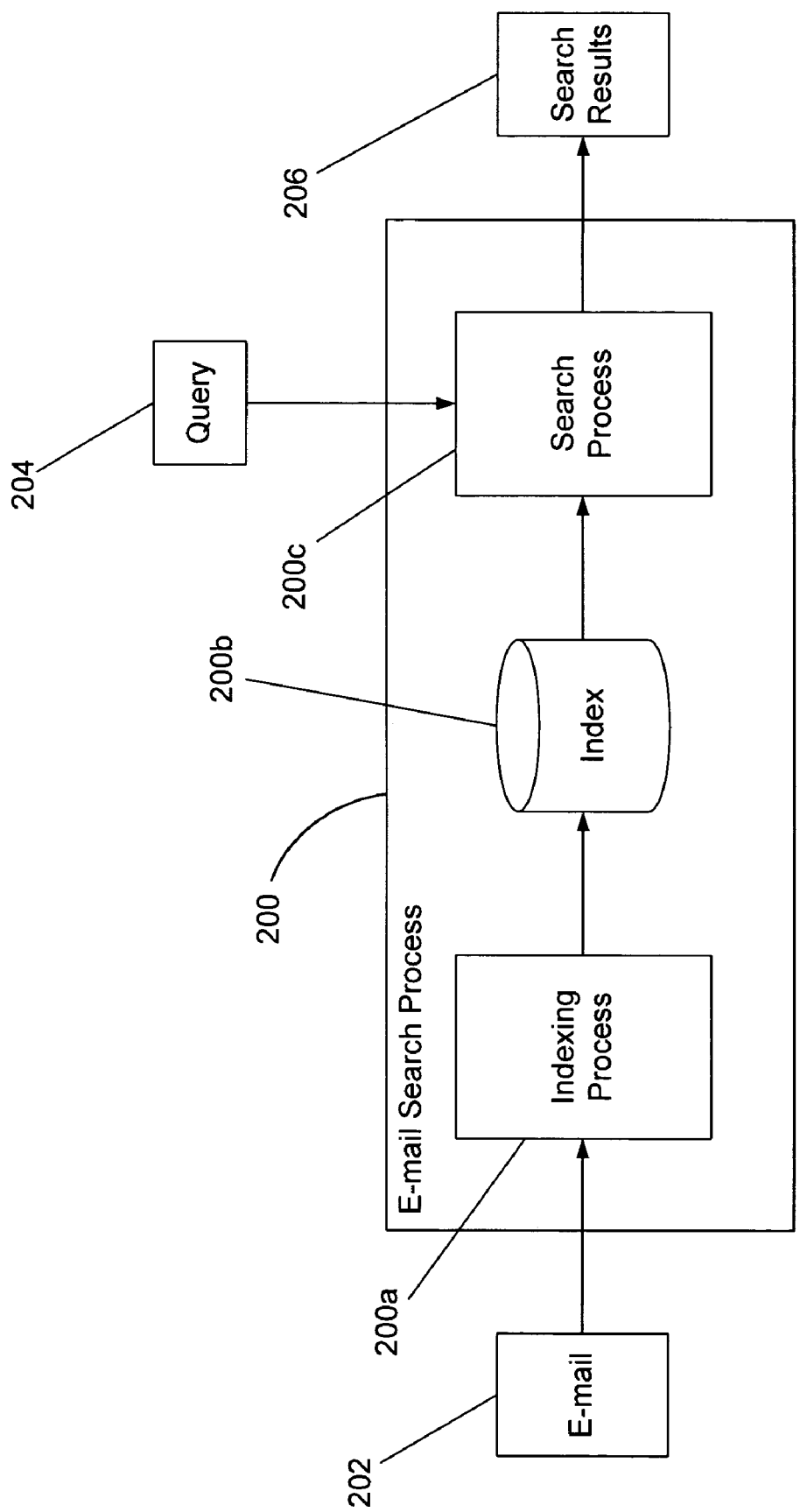
FIG. 2 is a diagram that illustrates an example of an e-mail search process that may be implemented in the networked computing environment of FIG. 1.

Referring to FIG. 2, an e-mail search process 200 may be used in system 100 to allow an e-mail user to perform text searching of the user's e-mail. E-mail search process 200 may be host-based, which means that it may be implemented on a server, such as e-mail server 130a or 130b or another server connected to e-mail server 130a or 130b. Alternatively, or additionally, the e-mail search process may be client-based, which means that it may be implemented on client system 110a or 110b or another system locally connected to client system 110a or 110b.

E-mail search process 200 includes an indexing process 200a, an index 200b, and a search process 200c. Indexing process 200a accesses a user's e-mail 202 and constructs index 200b, which is a representation of the user's e-mail that is used to search the e-mail. Indexing process 200a may access the user's e-mail, for example, from an e-mail store (not shown) such as the user's mailbox on e-mail server 130a or 130b or an e-mail file on client system 110a or 110b, or may access each e-mail from memory (either on server 130a or 130b or on client system 110a or 110b) when the e-mail is first received.

Search process 200c receives or accesses a query 204 that contains one or more query strings, where a string is a series of zero or more characters. For example, a user of client system 110a or 110b may be presented with a user interface into which the user can enter a query that contains one or more characters, such as letters, numbers, spaces, or punctuation. The query is then provided to search process 200c.

Search process 200c then uses index 200b to assist in identifying which ones of the user's e-mails satisfy the query. Search process 200c then produces search results 206 indicating the identified e-mails.

The search results then may be used to present the identified e-mails, or indications of the identified e-mails, to the user of client system 110a or 110b. When indications of the identified e-mails are presented, the user may be allowed to select an indication, and the corresponding e-mail may be presented to the user.

Figure 3:
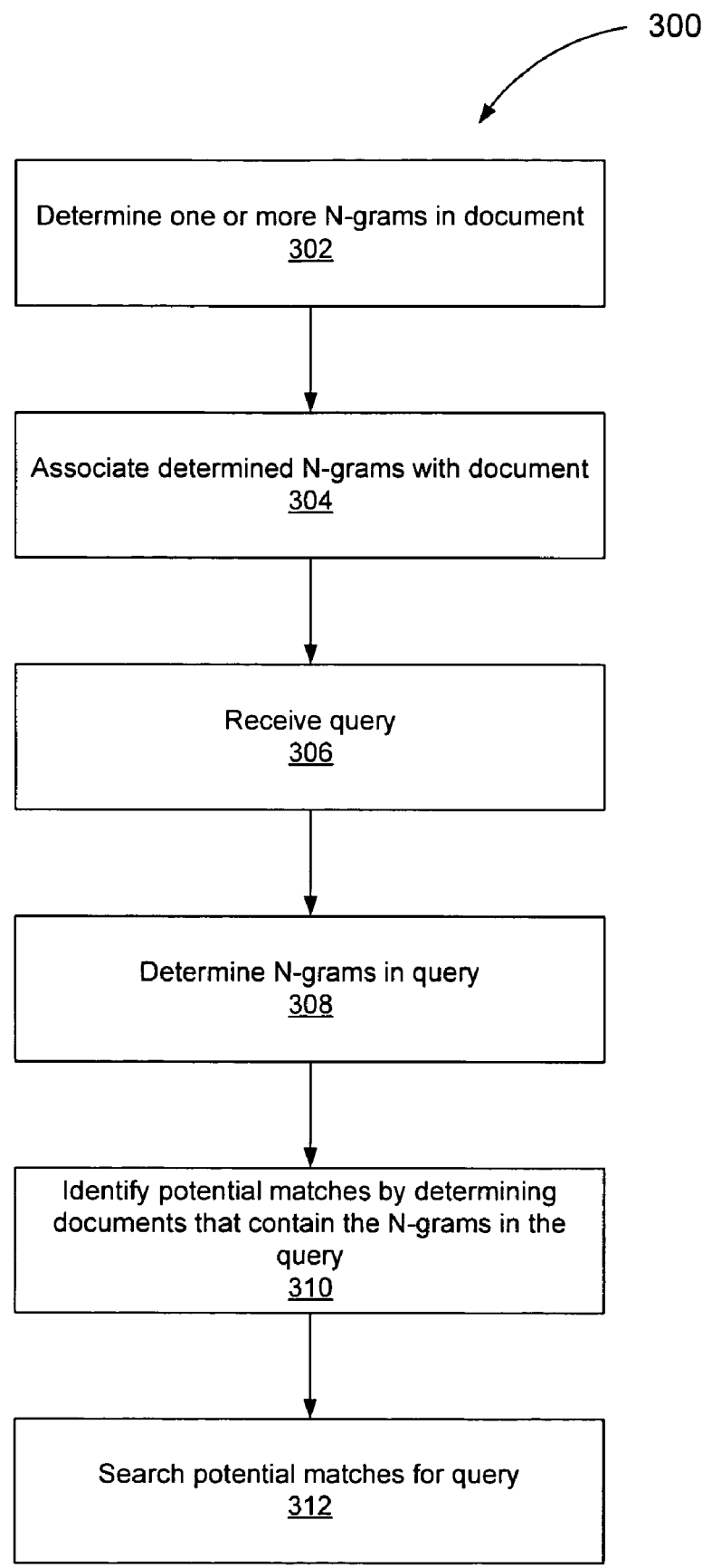
FIG. 3 is a flow diagram illustrating a process that may be performed by the e-mail search process of FIG. 2.

Referring to FIG. 3, e-mail search process 200 uses N-grams for indexing and searching e-mails 202. N-grams are N-character sequences contained in a string, where N is an integer greater than one (e.g., digrams are two-character sequences, while trigrams are three-character sequences). For instance, the word "CAT" includes the following digrams (counting the leading and trailing spaces, which are indicated by "_"): "_C," "CA," "AT," "T_."

In general, to index an e-mail, indexing process 200a determines one or more N-grams contained in the e-mail (302) and constructs or modifies index 200b by creating one or more records in index 200b that associate the e-mail with the determined N-grams (304). To perform a search, search process 200c receives a query that includes one or more query strings (306) and determines e-mails that are potential matches for the query (i.e., that potentially contain one or more of the query strings in the query). To do so, search process 200c determines N-grams contained in the query (308) and uses index 200b to determine which e-mails contain the N-grams (310). Search process 204 then searches the potential matches for the query string or strings to determine which of the potential matches satisfies the query (312).

The N-grams used by e-mail search process 200 may include 0-offset N-grams and/or M-offset N-grams (where M is an integer greater than zero). M-offset N-grams are N-character sequences contained in a string, where the characters in the sequences are those that are separated by M characters, as opposed to 0-offset N-grams in which the characters in the sequences are those that are adjacent characters (such as is shown above with respect to the word "CAT"). For example, in the word "DIGRAM":

The 0-offset digrams are: _D, DI, IG; GR, RA, AM, M_

The 1-offset (i.e., level 1) digrams are: _I, DG, IR, GA, RM, A_

The 2-offset (i.e., level 2) digrams are: _G, DR, IA, GM, R_

The 3-offset (i.e., level 3) digrams are: _R, DA, IM, G_

The 4-offset (i.e., level 4) digrams are: _A, DM, I_

The 5-offset (i.e., level 5) digrams are: _M, D_

There are no 6-offset or greater digrams.

The N-grams used by e-mail search process 200 may include only 0-offset N-grams, only a single level of M-offset N-grams, a combination of 0-offset N-grams and one or more levels of M-offset N-grams, or a combination of one or more levels of M-offset N-grams.

Figure 4:
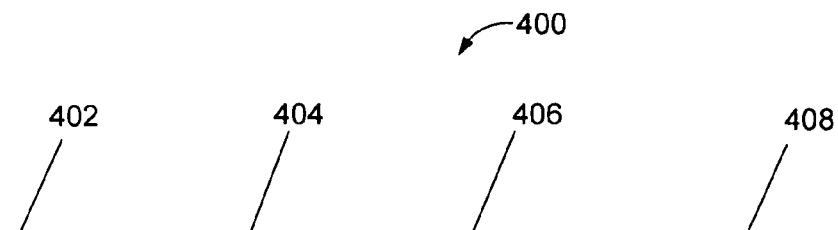
FIG. 4 is a table that illustrates some examples of strings and examples of corresponding N-grams.

Referring to FIG. 4, a table 400 shows some sample strings 402 and the corresponding 0-offset digrams 404, 1-offset digrams 406, and 0-offset trigrams 408, where "_" is used to represent a space. The N-grams 404, 406, and 408 are listed in alphabetical order, the punctuation (i.e., the period) has been converted to a space, and all lower-case characters have been converted to upper-case.

E-mail search process 200 may support, e.g., Boolean searching, phrase searching, and/or substring searching. A Boolean search is a search that allows the inclusion or exclusion of documents containing certain words through the use of operators such as AND, NOT, and OR. For example, a Boolean search of strings 402 for "dog AND mat" would return string 2 because it contains both the string "dog" and the string "mat," but would not return strings 1 or 2 because these strings do not contain the term "dog." For a Boolean search, each word or term is considered a query string.

A phrase search is a search for documents containing an exact sentence or phrase. For example, a phrase search for "The dog" would only return string 2 because the phrase "The dog" is included in string 2, but not in strings 1 or 3. For phrase searching, the phrase is considered a query string.

A substring search is a search for documents that contain a string, regardless of whether the string is a complete word or forms part of a word. For example, a substring search for "at" would return strings 1, 2, and 3 because the string "at" is included at least in the word "mat" in strings 1, 2, and 3.

To support various search types, certain N-grams contained in the query may or may not be used when determining potential matches. For example, when 0-offset digrams are used, the digrams that include spaces (e.g., "_C") may not be used so as to support substring searches. As another example, when 1-offset digrams are used, the 1-offset digrams that skip over spaces (e.g., "EC" in "THE CAT") may not be used so as to accommodate AND searches. To perform phrase searching instead, the 1-offset digrams that skip over spaces may be included. Similarly, when trigrams are used, the trigrams that include spaces between alphanumeric characters may be excluded to support AND searches, or included to support phrase searching.

Certain N-grams in a query may or may not be used when identifying potential matches by simply not determining them from the query strings. For example, for a Boolean search, the N-grams generally may be determined for each word or term separately (e.g., N-grams are determined for "The" and "Cat" separately), while for phrase searching, the N-grams may be determined for the combination (e.g., the N-grams are determined for "The Cat"). In such a situation, 1-offset digrams with skipped spaces are not determined for Boolean searches, but they are for phrase searches.

Alternatively, or additionally, certain N-grams in a query may or may not be used when identifying potential matches by determining them from the query strings and then using or not using them as appropriate. For instance, all queries may be treated as a combination of words, with the N-grams being determined for the combination (e.g., N-grams are determined for "The cat" regardless of whether the search is a Boolean or phrase search). Then, only certain N-grams are used when identifying the potential matches (e.g., the 1-offset digram "EC" is not used to support AND searching).

In general, identifying potential matches based on all of the N-grams contained in a query (absent the ones that need to be excluded to accommodate a particular type of search, if any) may provide the least number of false positives. However, potential matches may be identified based on less than all of the appropriate N-grams contain in a query. Doing so, however, may result in a higher number of false positives and consequent searches of the corresponding e-mails.

Referring to FIGS. 5A and 5B, e-mail search process 200 may use document N-gram maps, such as document N-gram bitmaps 500 or 550, to represent the N-grams in an e-mail. Document N-gram bitmap 500 represents a document and indicates N-grams in the document. In general, a document bitmap that represents a document contains a set of bits, where each bit represents a particular digram. When the document contains the digram represented by a particular bit, the bit is set (i.e., made equal to one) and when the document does not contain the digram, the bit is cleared (i.e., set to zero). An opposite convention may be used, i.e., the bit may be cleared when the digram is present and set when the digram is not present.

Document N-gram bitmap 500 is an example of a portion of a document digram bitmap that represents string 1 from FIG. 4 and indicates the digrams contained in string 1. Document digram bitmap 500 is shown as a two-dimensional matrix in which the columns represent the first character in a digram while the rows represent the second character in the digram. Because bitmap 500 represents string 1, the bits for "_C," "CA," and "E_" are set, while the other bits are cleared.

By contrast, document N-gram bitmap 550 represents a N-gram and indicates items, such as e-mails or strings, containing the N-gram. A document bitmap that represents a N-gram contains a set of bits, where each bit represents a particular document. A particular bit is set (i.e., made equal to one) when the N-gram is contained in the document represented by the bit and the particular bit is cleared (i.e., set to zero) when the document does not contain the digram. As with bitmap 500, an opposite convention may be used.

Document N-gram bitmap 550 is an example of a document trigram bitmap that represents the trigram "_CA" and indicates strings 402 from table 400 that contain the trigram "_CA." Because strings 1 and 3 contain the trigram "_CA," their corresponding bits are set, while the bit corresponding to string 2 is cleared.

The form of bitmap 500 may allow a bitmap representing an e-mail to be written to, for example, a hard drive, in a single block, while the form of bitmap 550 may allow a bitmap representing a N-gram to be written as a single block.

E-mail search process 200 also may use query N-gram maps, such as a query N-gram bitmap, to represent the N-grams contained in a search query. The query N-gram maps may be similar to document N-gram map 500 in that the query N-gram maps represent the query and indicate the N-grams contained in the query.

Figure 6A:
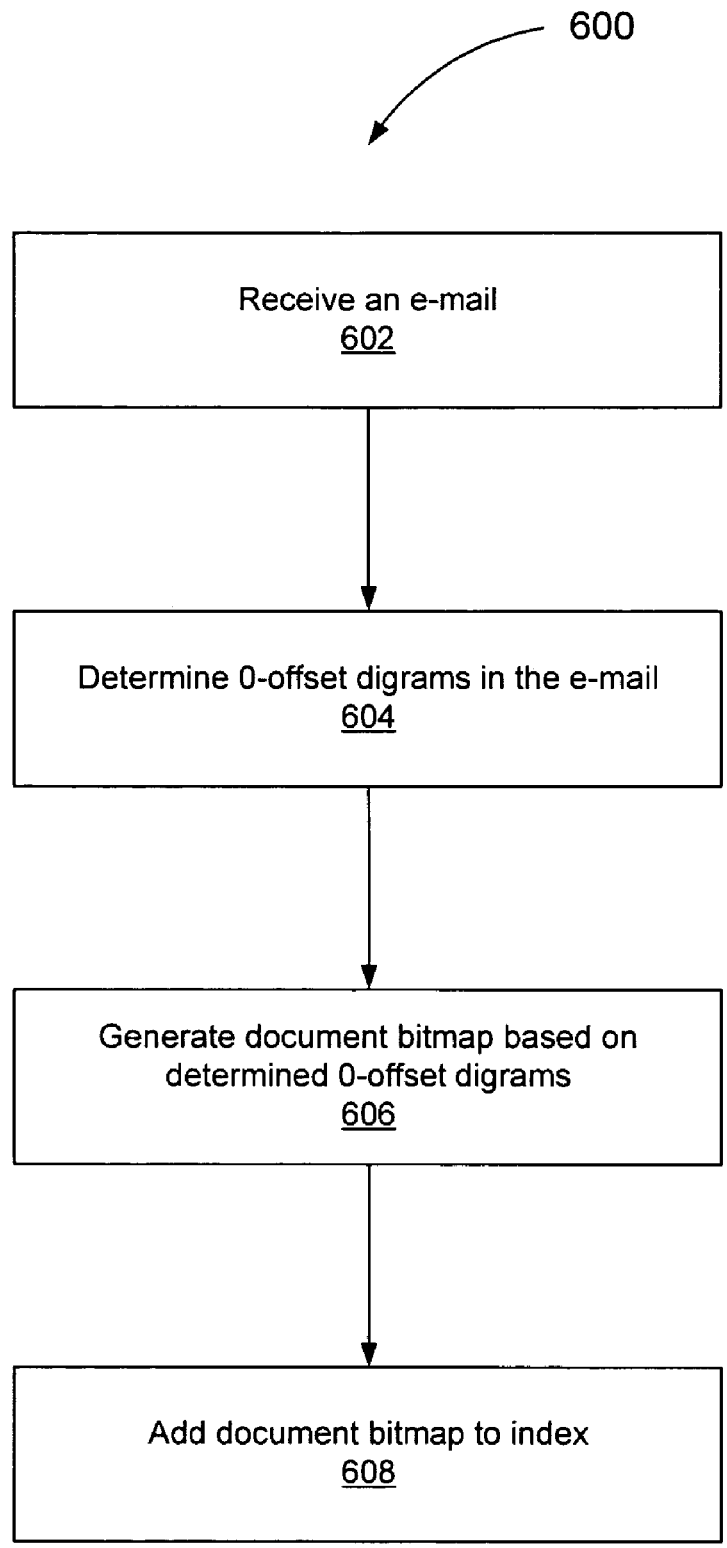
FIGS. 6A-8B illustrate various processes that may be implemented by the e-mail search process of FIG. 2.
Figure 6B:
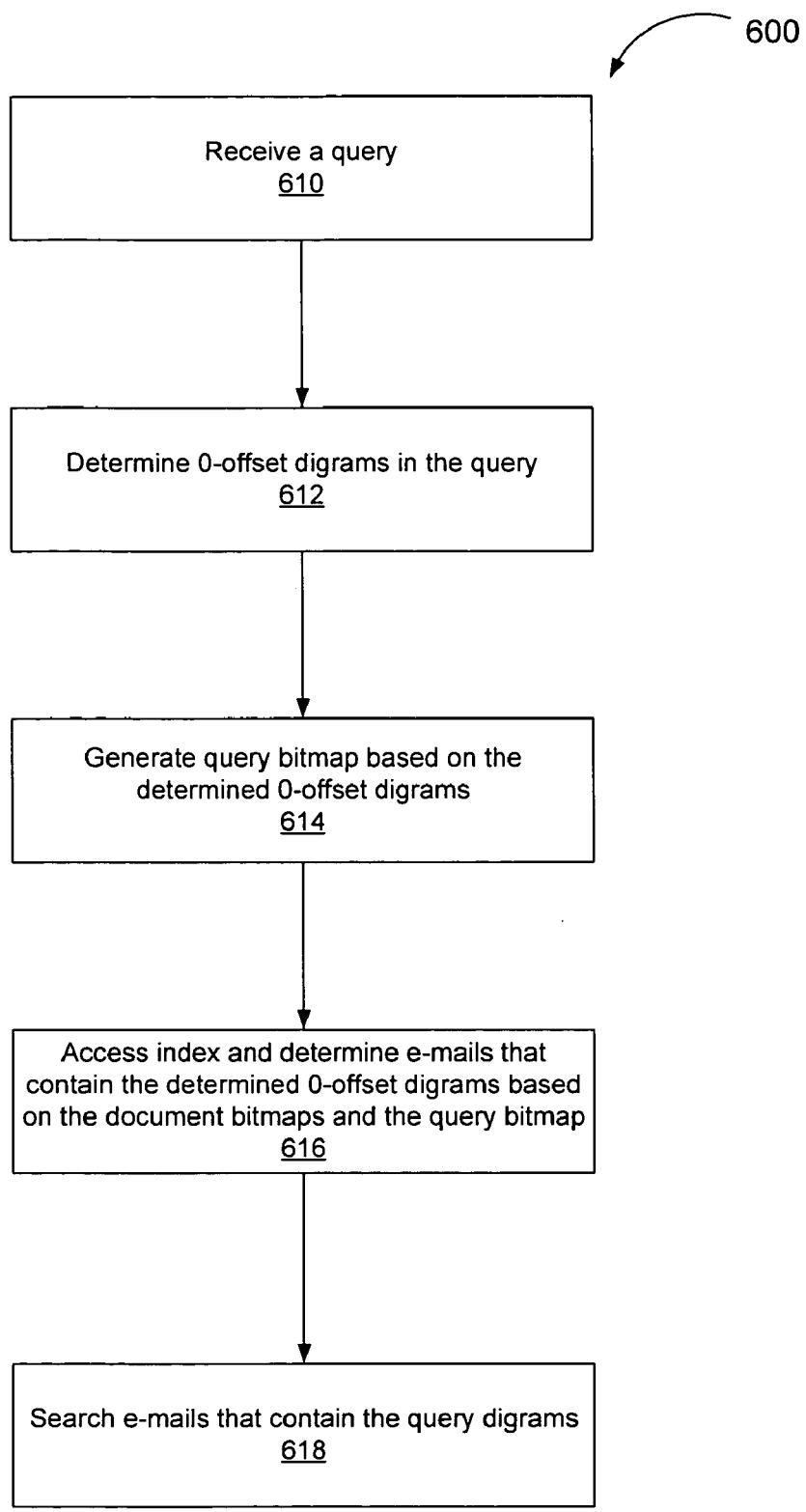

Referring to FIGS. 6A and 6B, one particular implementation 600 employs only 0-offset digrams and document digram bitmaps that represent e-mails. As shown in FIG. 6A, to perform indexing, indexing process 200a receives or accesses an e-mail that contains zero or more characters (602). Indexing process 200a then determines the 0-offset digrams in the e-mail (604) based on the characters and generates a document digram bitmap based on the determined 0-offset digrams (606). The document digram bitmap represents the e-mail and indicates the 0-offset digrams contained in the e-mail. To this end, indexing process 200a may consider the e-mail to be one long string, with some normalization of the characters in the string. The normalization may include converting lower-case letters to upper-case letters, converting punctuation to spaces, and compressing multiple consecutive spaces into one space. This normalization results in 37 unique characters: 26 alphabetics, 10 digits, and 1 space. The corresponding document digram bitmap then may be represented as a 37×37 boolean matrix, similar to the matrix shown in FIG. 5A. In certain implementations, the indexing process may exclude certain digrams that are exceedingly common (e.g., "TH" or "HE" which are found in "THE") or exceedingly rare (e.g., "QZ")

such that they are likely to be of little or no value in subsequent searching. After generating the document digram bitmap, indexing process 200a adds the document digram bitmap to index 200b (608).

As shown in FIG. 6B, search process 200c then accesses or receives a search query that contains at least one query string (610) and determines the 0-offset digrams in the query string (612). Search process 200c then generates a query digram bitmap based on the determined 0-offset digrams (614) and accesses index 200b to determine the e-mails that contain the determined 0-offset digrams based on the document bitmaps and the query bitmap (616). For example, search process 200c may compare the query bitmap to the document bitmaps to determine document bitmaps that contain the same digrams as the query bitmap. Search process 200c then searches the determined e-mails for the query string (618). For example, a full-text search may be performed by considering each e-mail to be one long string and searching sequentially through the characters of the string until the query string is located or until the end of the string is reached.

Using strings 402 as examples of e-mails to be indexed and searched, in one example of implementation 600, indexing process 200b may create one or more records in index 200b that:

Associates string 1 with the 0-offset digrams: _C, _I, _M, _ O, _T, AT, CA, E_, HE, IS, MA, N_, ON, S_, T_, TH Associates string 2 with the 0-offset digrams: _D, _I, _M, _O, _T, AT, DO, E_, G_, HE, IS, MA, N_, OG, ON, S_, T_, TH Associates string 3 with the 0-offset digrams: _C, _I, _M, _O, _T, AR, AT, CA, E_, HE, IS, MA, N_, ON, S_, R_T_, TH Search process 200c then may receive a query that contains a query string, such as, for example, "CAT." To search for e-mails that contain "CAT," search process determines the digrams in "CAT" _C, CA, AT, Tj and uses index 200b to determine which of strings 402 contain the digrams (and, consequently, are a potential match for the query). Strings 1 and 3 would be identified because they contain the digrams in "CAT." Search process 200c then searches strings 1 and 3 for "CAT," which results in string 1 being identified as containing "CAT" (string 3 is a false-positive in that it contains the digrams but not the set of consecutive characters).

Random disk reads and writes (Input/Outputs, or I/Os) and storage space may be metrics of interest in evaluating the performance characteristics of an e-mail search application. The following are estimated performance characteristics of implementation 600:

| Index size: | 172 bytes/document |
| --- | --- |
| Indexing I/Os: | 1/document |
| Search I/Os: | 1 + (0.314 × D documents), where D is the number of documents to be searched |

The index size is based on a normalization of text in implementation 600 that employs converting lower-case letters to upper-case letters and converting punctuation to spaces, with a resulting document digram bitmap that is represented as a 37×37 boolean matrix, as described above with respect to implementation 600. Such a document digram bitmap includes 37×37 bits, which is 1369 bits or 172 bytes. Thus, in implementation 600, which stores a single bitmap for each e-mail, e-mail search process 200 stores a 172 byte index for each e-mail. The index size may be further reduced by eliminating digrams (e.g., exceedingly rare or exceedingly common digrams) that are unlikely to be useful in reducing the number of false positives.

With respect to the indexing I/Os, indexing process 200a may determine the digrams in an e-mail and generate the document digram bitmap when an e-mail is initially received and in memory. Doing so would incur no I/Os. When indexing process 200a writes the document digram bitmap to index 200b, one I/O is incurred. Thus, the indexing cost may be one I/O per document indexed.

With respect to search performance, reading the digram bitmaps may result in only one random I/O since the digram bitmaps may be stored on contiguous disk blocks for a given mailbox. But search process 200c searches each e-mail that potentially contains the query. In this case, performance depends on how many potential matches result when search process 200c determines which e-mails contain the digrams determined from the query. Tests show that 31.4% of e-mails are potential matches for each query, with a standard deviation of 23.06. This results in an estimate of the search I/Os equal to 1+(0.314×D documents), where D is the number of documents to be searched.

By comparison, the following table shows the performance characteristics for a so-called brute-force scan system. A brute force scan system reads in each document, considers the document to be one long string, and sequentially searches the characters in the string until the query string or strings are located or until the end of the string is reached. In a brute force scan system, there is no index beyond the document texts themselves, and there is no processing required for indexing beyond storage. However, searching requires that every document be read, costing one I/O per document.

| Index size: | 0 |
| --- | --- |
| Indexing I/Os: | 0 |
| Search I/Os: | 1 I/O per document per search |

Using the estimated performance characteristics for implementation 600, the following table shows the resulting search I/Os for various mailbox sizes for implementation 600.

| Number of E-mails | Number of I/Os |
| --- | --- |
| 25 | 9 |
| 50 | 17 |
| 100 | 33 |
| 250 | 80 |
| 500 | 158 |
| 1000 | 315 |
| 2500 | 786 |
| 5000 | 1571 |
| 10000 | 3141 |

By comparison, the brute force method requires the same number of I/Os as the number of e-mails. For example, to search 5000 E-mails, the brute force method requires 5000 random I/Os while implementation 600 requires only 1571 random I/Os.

Figure 7A:
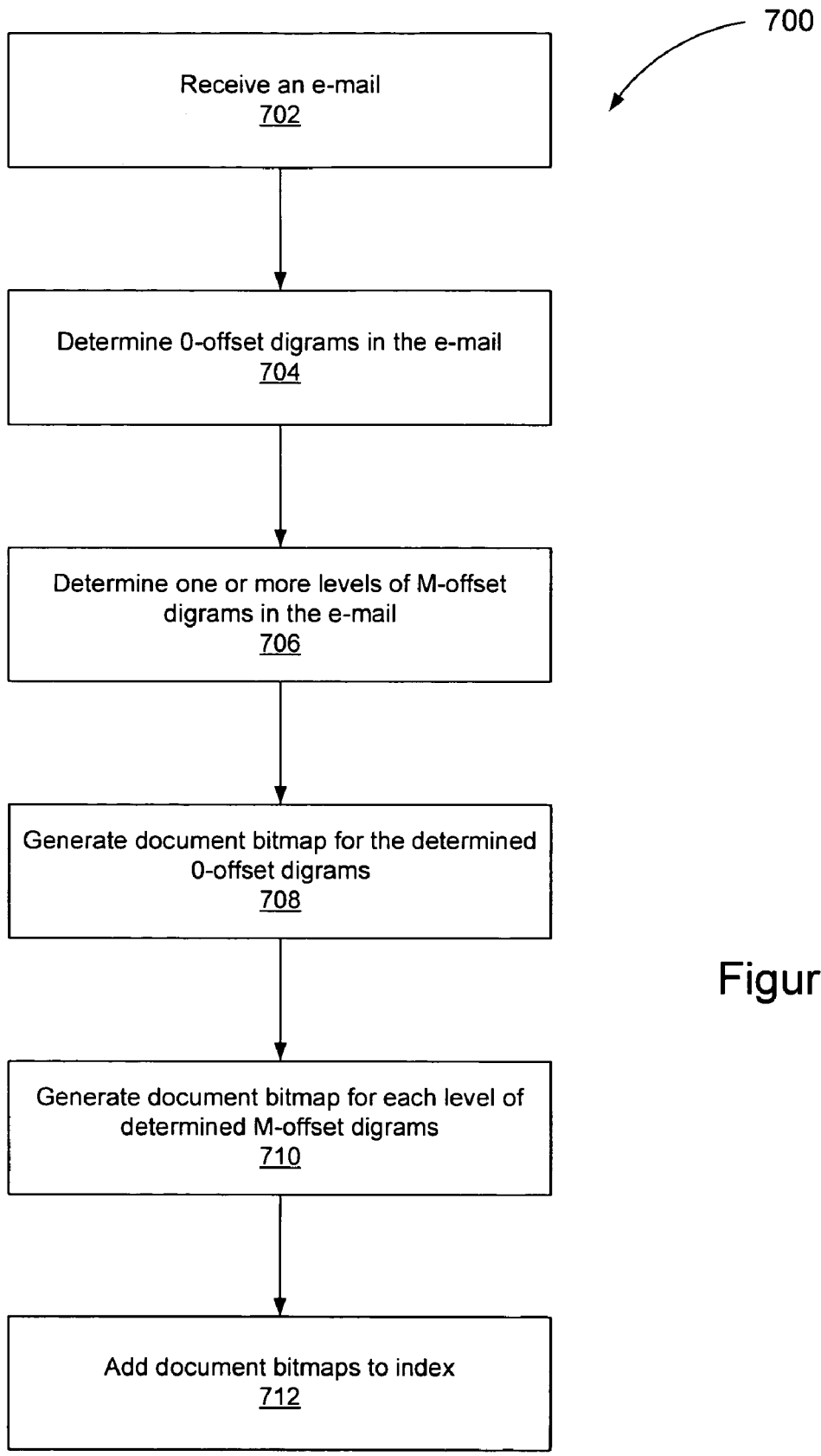
Figure 7B:
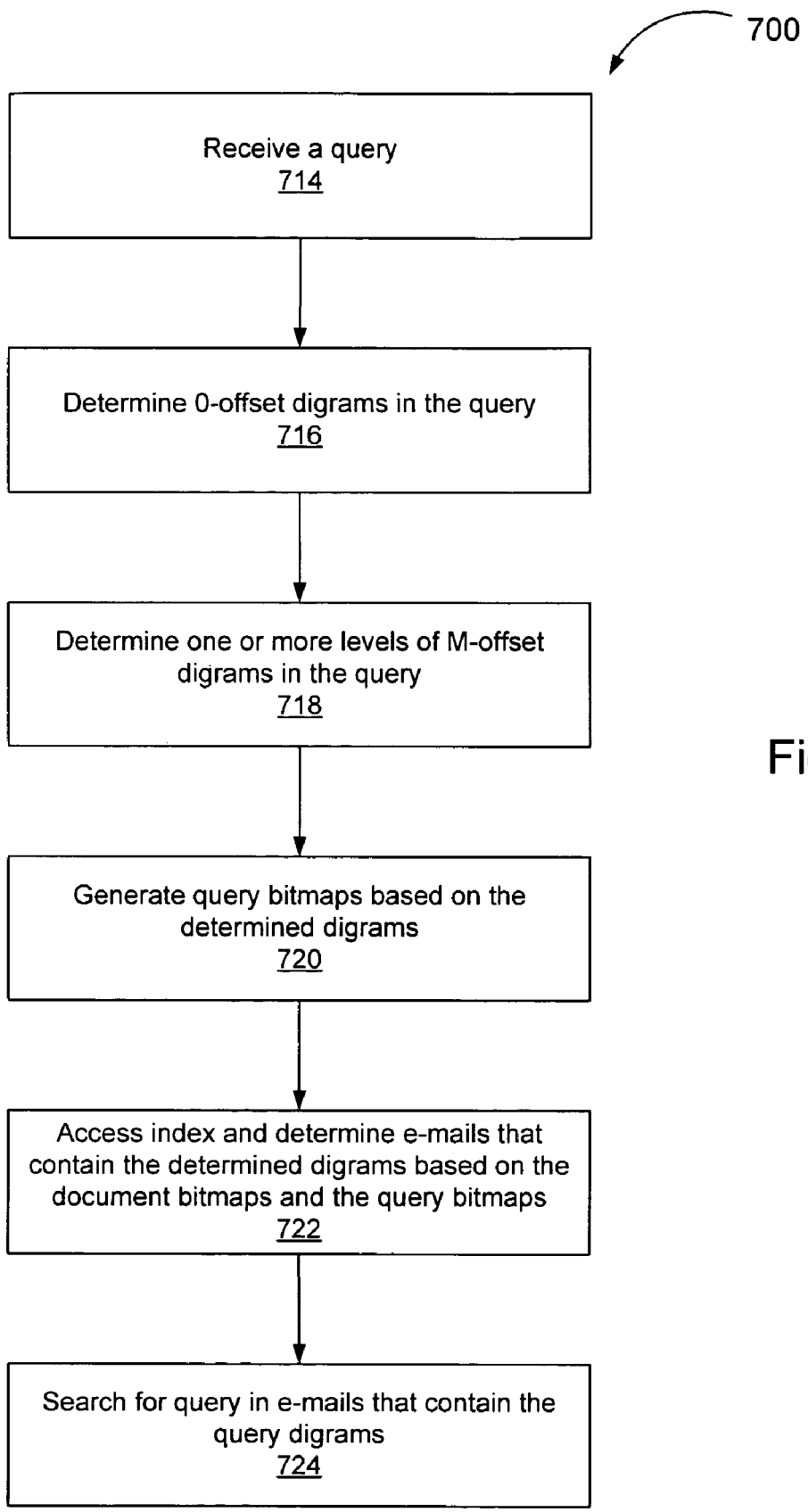

Referring to FIGS. 7A and 7B, another particular implementation 700 uses a combination of a 0-offset digrams and one or more levels of M-offset digrams for each e-mail. By using one or more levels of M-offset digrams in addition to 0-offset digrams, the number of potential matches may be reduced, which may result in a reduction of the number of I/Os incurred for the search.

For example, referring again to table 400, using only the 0-offset map, searching for "CAT" produces a false positive by indicating string 3 is a potential match. But, if 1-offset digrams are used in addition to the 0-offset digrams, this false positive would not be identified as a potential match because text 3 does not contain the 1-offset digram CT, which appears in CAT.

Accordingly, as shown in FIG. 7A, to perform indexing, indexing process 200a receives or accesses an e-mail that contains zero or more characters (702). Indexing process 200a then determines the 0-offset digrams (704) and one or more levels of M-offset digrams (706) in the e-mail. For instance, indexing process 200a may determine 1-offset and 2-offset digrams in addition to the 0-offset digrams.

Indexing process 200a then generates a document digram bitmap for the determined 0-offset digrams (708) and a document digram bitmap for each level of M-offset digrams determined (710). For example, indexing process may generate a document digram bitmap for 0-offset digrams, a document digram bitmap for 1-offset digrams, and a document digram bitmap for 2-offset digrams. The document digram bitmaps represent the e-mail and indicate the 0-offset and one or more levels of M-offset digrams contained in the e-mail. To this end, as with implementation 600, indexing process 200a may consider the e-mail to be one long string and normalize the characters in the string by converting lower-case letters to upper-case letters, converting punctuation to spaces, and compressing multiple consecutive spaces into one space. After generating the document digram bitmaps, indexing process 200a adds the document digram bitmaps to index 200b (712).

As shown in FIG. 7B, search process 200c then accesses or receives a search query that contains at least one query string (714), determines the 0-offset digrams in the query string (716), and determines the M-offset digrams for each level of M-offset digrams used (718). The levels of M-offset digrams used by search process 200c is the same as the levels used by indexing process 200c. For example, if indexing process 200a is using 1-offset and 2-offset digrams, search process 200c also uses 1-offset and 2-offset digrams.

Search process 200c then generates a query digram bitmap based on the determined 0-offset digrams and one or more levels of M-offset digrams (720), and accesses index 200b to determine the e-mails that contain the determined digrams based on the document bitmaps and the query bitmap (722). Search process 200c then searches the determined e-mails for the query string using a full-text search.

Based on tests, the following percentage of e-mails that are potential matches for each query were determined for combinations of 0-, 1-, and 2-offset digram maps:

| Maps used | % hit |
| --- | --- |
| 0-offset | Average: 31.4% |
| | Standard Deviation: 23.1 |
| 0-offset and 1-offset | Average: 17.4% |
| | Standard Deviation: 17.4 |
| 0-offset, 1-offset, and 2-offset | Average: 12.3% |
| | Standard Deviation: 15.2 |

As can be seen, each additional level of M-offset digrams used per e-mail may reduce the potential matches. Each additional level may do so, however, at the cost of creating and storing an additional association between the e-mail and the additional level. For example, using a 1-offset digram bitmap and 2-offset digram bitmap for each e-mail reduces the number of potential matches with respect to using only a 1-offset digram bitmap, but may result in the creation and storage of an additional bitmap, namely the 2-offset digram bitmap. But, if all of the document digram maps for a mailbox are packed together, there may be no additional random I/O costs. Accordingly, in such a situation, the additional cost of using multiple levels of M-offset maps is to increase the amount of storage by 172 bytes per document per level of M-offset map (assuming normalization as described above that results in 37 characters). Therefore, using multiple levels of M-offset maps may not increase the number of random I/Os incurred. But even if additional random I/Os are needed to read in the additional bitmaps, the savings during searching may justify these additional I/Os.

Accordingly, the estimated overall performance characteristics using 0-, 1-, and 2-offset digram bitmaps in combination are as follows (assuming no additional I/Os are needed to create, store, and read the additional levels of M-offset digrams and a normalization such as described above that results in 37 characters):

| | |
| --- | --- |
| Index size: | 516 bytes/document |
| Indexing I/Os: | 1/document |
| Search I/Os: | 1 + (0.123 × D documents) |

The following table shows the resulting search I/O costs based on the estimated performance characteristics using 0-offset, 1-offset, and 2-offset digram maps in combination, assuming no additional I/Os are needed to create, store, and read the additional levels of M-offset digrams.

| Number of E-mails | Number of random I/Os |
| --- | --- |
| 25 | 5 |
| 50 | 8 |
| 100 | 14 |
| 250 | 32 |
| 500 | 63 |
| 1000 | 124 |
| 2500 | 309 |
| 5000 | 616 |
| 10000 | 1231 |

Figure 8A:
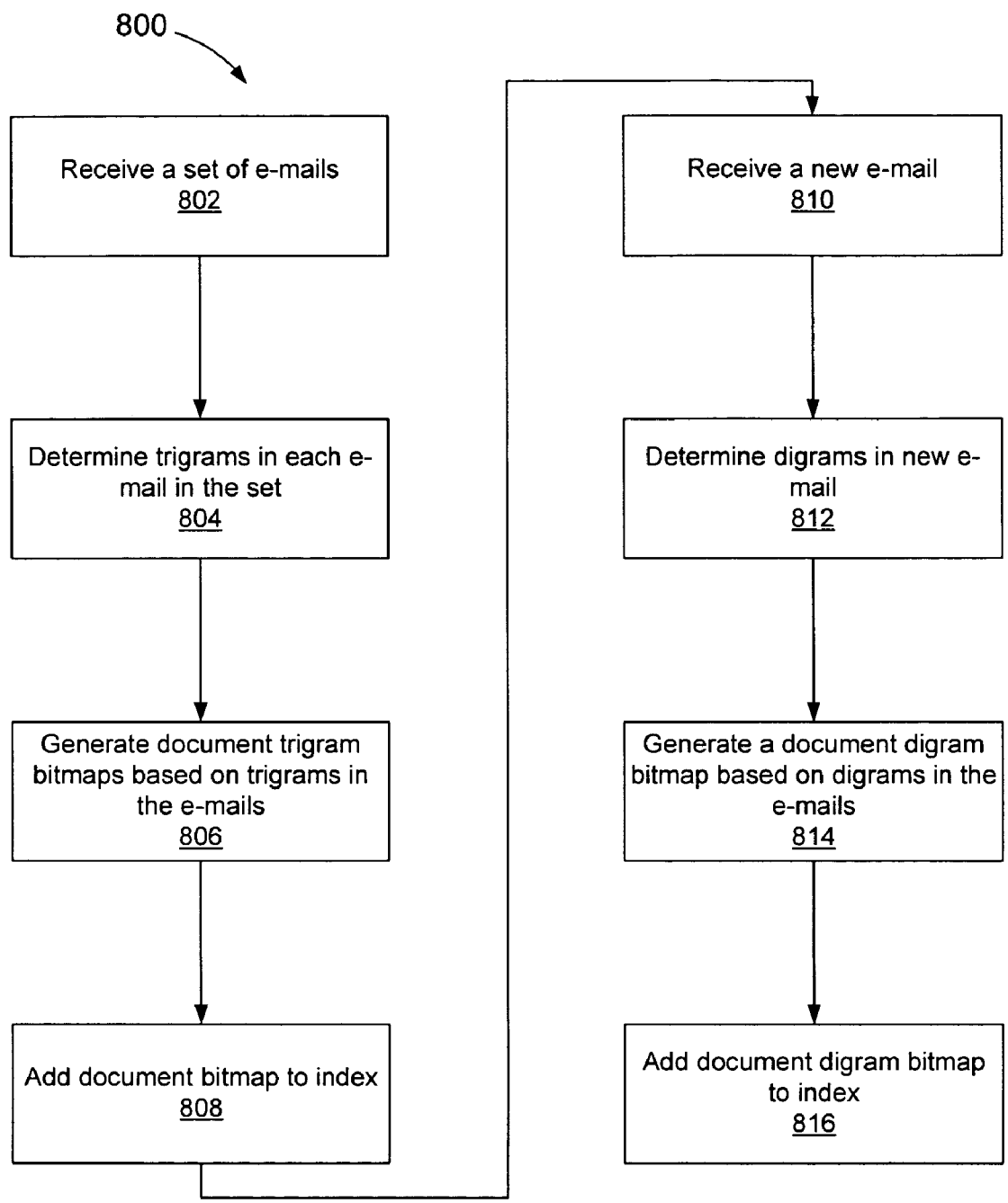
Figure 8B:
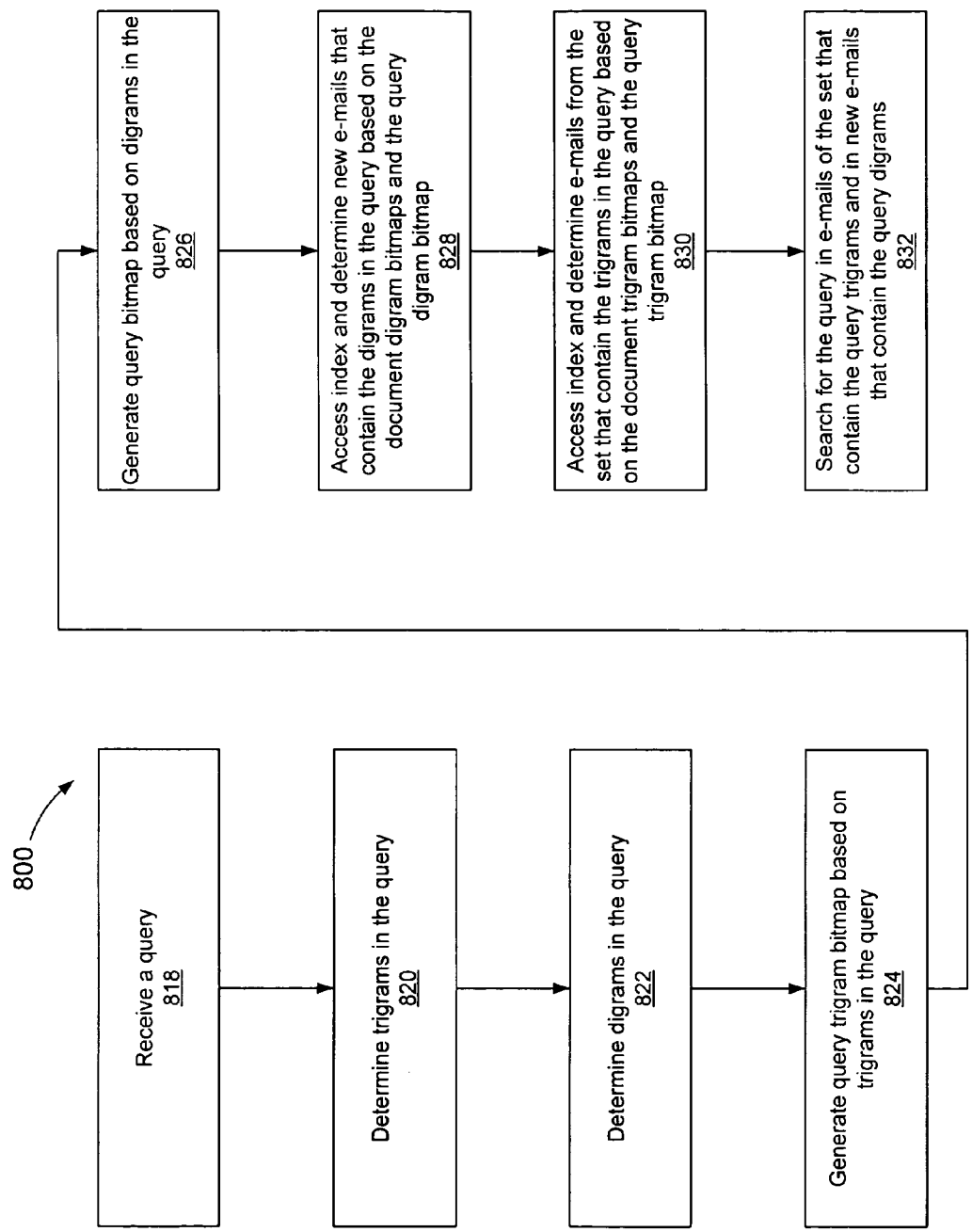

Referring to FIGS. 8A and 8B, another particular implementation 800 uses digrams for the most recently received e-mails while using a trigram-based scheme for searching older e-mails. For larger quantities of e-mails, other search methods (e.g., a trigram-based approach) may be more efficient than digram based-approaches such as implementations 600 and 700 described above. Accordingly, in implementation 800, when the number of e-mails in a user's mailbox reaches a certain threshold, the e-mails are indexed using trigrams, while new e-mails are indexed using a digram based approach (such as implementation 600 or 700) until the number of new e-mails reaches the threshold. Once the new e-mails reach the threshold, they are indexed using trigrams.

Tests have shown that the percentage of e-mails that are potential matches when trigrams are used is 2.48%. Accordingly, using trigrams in an implementation such as 600 or 700 may reduce the number of potential matches. However, using trigram bitmaps with a form such as bitmap 500 in implementation 600 or 700 may not be as efficient in an e-mail search application. Using a trigram bitmap with a form such as bitmap 500 (and normalization that provides 37 characters) results in a bitmap having (37×37×37) bits, which is 50,653 bits or 6331 bytes. This is comparable to the average size of an e-mail, 8 K bytes. Thus, it may takes almost as many I/Os to read in the document trigram bitmaps as to read in the e-mails themselves. The trigram bitmaps may be reduced by eliminating trigrams that are unlikely to add value to the search process.

Document trigram bitmaps alternatively may have a form such as bitmap 550. In this case, to determine e-mails containing a trigram, only the block containing that trigram's bitmap is read. In order to test all trigrams in a query, each bitmap representing a trigram in the query is read. The average query has 15.17 trigrams in it, which results in an average of 15.17 trigram bitmaps being read (which, given the reduced number of false positives, may result in a relatively low number of search I/Os for mailboxes with larger numbers of e-mails).

A disadvantage of using trigram bitmaps with a form such as bitmap 550 in an implementation such as 600 or 700 may be that indexing an e-mail requires writing to every trigram's bitmap. This may be tens of thousands of writes. If each e-mail is indexed separately, thousands of I/O's may be needed to index each e-mail.

However, if e-mails are indexed in a batch, the cost of writing the trigram maps is amortized across all the e-mails in the batch. For example, if a batch of 1000 e-mails are indexed, the trigram maps may be constructed in memory and written out at once.

Further, trigram bitmaps do not need to be created for the trigrams that do not appear in at least one e-mail of the batch. Tests show that an average collection of 1000 documents contains 32,452 unique trigrams (out of 50,643 possible trigrams). Thus, on average, only 32,452 trigram bitmaps need to be written for each 1000 document batch. Accordingly, the total number of I/Os to write out the bitmaps is 500 on average, where there are 32,452 trigram maps, 1000 bits or 125 bytes/trigram map, and 65 trigram maps/8K block (the size of an I/O).

Thus, to index a batch of 1000 documents, 500 writes would be performed, which results in 0.5 I/Os per document. In addition, one I/O results from reading in each document during indexing. Thus, constructing a trigram map requires 1.5 I/Os per document.

Searching includes, on average, 16 I/Os to read the trigrams maps (based on an average of 15.17 trigrams in a query) plus a number of IOs corresponding to the number of potential matches (which are read in and searched). As described, on average, the percentage of e-mails that are potential matches is 2.48%. Thus, on average, the number of potential matches is 0.0248×D documents, where D is the total number of documents to be searched.

Thus, the I/O costs for such a system are as follows:

| | |
|---|---|
| Index size: | 32,452 bits/document, 4057 bytes/document |
| Indexing I/Os: | 1.5/document |
| Search I/Os: | 16 + (0.0248 × D documents) |

Such a trigram approach may be more efficient for searching larger quantities of e-mails than implementations, such as implementations 600 or 700, that use digram approaches, while implementations such as implementations 600 or 700 may be more efficient for smaller quantities of e-mails. Accordingly, in implementation 800, when a mailbox has, e.g., 1000 e-mails, they are submitted for trigram-based indexing with document trigram bitmaps that represent the trigrams in the e-mails. For new e-mails, a digram-based implementation is used.

More specifically, as shown in FIG. 8A, when the number of e-mails in a user's mailbox reaches a certain threshold (e.g., 1000), the set of e-mails in the user's mailbox is provided to indexing process 200*a* (802), which performs indexing of the e-mails as a set. To do so, for each e-mail in the set, indexing process 200*a* determines the trigrams in the e-mail (804). Based on the trigrams in the e-mails of the set, indexing process generates document trigram bitmaps (806). Instead of each document trigram bitmap representing a document, however, a form such as document bitmap 550 is used. That is, each document trigram bitmap represents a trigram contained in the set of e-mails and indicates the e-mails that contain the trigram. Indexing process 200*a* then adds the document trigram bitmaps to index 200*b*.

As new e-mails are received, the e-mails are provided to indexing process 200*a* (810). Indexing process 200*a* determines the digrams in the e-mail (812). Indexing process 200*a* may use implementations 600 or 700 for the new e-mails (i.e., use only 0-offset digrams or a combination of 0-offset and M-offset digrams), or may use some other implementation that uses digrams.

Indexing process 200*a* then generates a document digram bitmap based on the determined digrams. The document digram bitmap represents the e-mail and indicates the digrams contained in the e-mail (i.e., a form such as bitmap 500 is used) (814). This document digram bitmap is then added to index 200*b* (816). Thus, index 200*b* effectively includes two indexes, an index for the document digram maps and an index for the document trigram maps.

As shown in FIG. 8B, when a search is performed, the query is received or accessed by search process 200*c* (818). Search process 200*c* determines the trigrams (820) and the digrams (822) in the query. Search process 200*c* then generates a query trigram bitmap based on the determined trigrams (824) and a query digram bitmap based on the determined digrams (826).

Index 200*b* is then accessed by search process 200*c* to determine new e-mails that contain the determined digrams based on the query digram bitmaps and the document digram bitmaps (828). Search process 200*c* also accesses index 200*b* to determine the e-mails from the set that contain the determined trigrams based on the query trigram bitmaps and the document trigram bitmaps (830).

Search process 200*c* then searches for the query in the e-mails of the set that contain the determined trigrams and the new e-mails that contain the determined digrams (832) using a full-text search.

The estimated performance characteristics of implementation 800 using 0-, 1-, and 2-offset digram bitmaps are as follows:

| Index size: | 4573 bytes/document | |
|---|---|---|
| Indexing I/Os: | Digram map I/Os + Trigram map I/Os | 1/document received by system + 1.5/document kept in long-term storage |
| Search I/Os: | Digram map search I/Os + Trigram search I/Os | 1 + 0.123 × (D Documents mod 1000) + (16 + 1000 * 0.0248) * (D Documents/1000), where D documents/1000 is an integer divide. |

As shown, the search I/Os include the digram search I/Os plus the trigram search I/Os. The digram search includes, on average, one I/O to read the digram map and one I/O for each potential match. As described earlier, on average, the percentage of e-mails that are potential matches when using 0-, 1-, and 2-offset digram bitmaps is 12.3%. Also, when the total number of documents to be searched is D and each 1000 documents are indexed using the trigram search, the number of documents subject to the digram search is D mod 1000. Therefore, the total number of potential matches is 1+0.123 (D documents mod 1000).

The trigram search includes, on average, 16 I/Os to read the trigrams maps (based on an average of 15.17 trigrams in a query) plus the number of potential matches (which are read in and searched). As described, on average, the percentage of e-mails that are potential matches is 2.48% for 1000 documents. Thus, on average, the number of potential matches for 1000 documents is 0.0248×1000 documents. The number of 1000 document blocks in the total documents D is an integer divide of D by 1000. Thus, the trigram search I/Os is 16+1000*0.0248 times the number of 1000 documents in the total documents D (i.e., D/1000).

The following table shows the resulting search I/Os for various mailbox sizes. Note that these figures assume that any mailbox that has at least one trigram-mapped block of 1000 messages also requires 1000 messages be searched using the digram method. This allows for delays in trigram indexing, reflects the fact that the figures for any size ranking are averages, and avoids numbers ratcheting up and down on the table due to the efficiency differences in digram and trigram mappings. These numbers should be viewed as rough averages.

| Number of E-mails | Number random of I/Os |
|---|---|
| 25 | 5 |
| 50 | 8 |
| 100 | 14 |
| 250 | 32 |
| 500 | 63 |
| 1000 | 165 |
| 2500 | 206 |
| 5000 | 328 |
| 10000 | 532 |

The techniques described above are not limited to any particular hardware or software configuration. Rather, they may be implemented using hardware, software, firmware or a combination thereof. The methods and processes described may be implemented as computer programs that are executed on programmable computers comprising at least one processor and at least one data storage system. The programs may be implemented in a high-level programming language and may also be implemented in assembly or other lower level languages, if desired.

Any such program will typically be stored on a computer-usable storage medium or device (for example, CD-Rom, RAM, or magnetic disk). When read into the processor of the computer and executed, the instructions of the program cause the programmable computer to carry out the various operations described above.

A number of implementations have been described. Nevertheless, it will be understood that various modifications may be made. For example, implementation 600 may be modified to use one level of M-offset digrams instead of 0-offset digrams. For instance, 1-offset digrams may be used. Implementations 600 and 700 may be modified to use other N-grams instead of, or in addition to, digrams, and implementation 800 may be modified to use other N-grams instead of, or in addition to, digrams and trigrams.

Implementation 800 also may be modified to use another search method (e.g., inverted file) for the set of e-mails. In some systems, an inverted file index or other search method may be more efficient for the larger set of documents than the trigram approach. Moreover, implementation 800 may be modified such that the secondary search method (i.e., the trigram search method) is not based on the number of received e-mails or other documents reaching a threshold. For example, implementations 600 or 700 may be used on newly received documents until the search system is able to index the newly received documents based on the secondary search method (e.g., the trigram approach described above or an inverted file search technique). Thus, for example, if a document retrieval system normally uses an inverted file search technique, N-gram techniques such as implementations 600 or 700 may be used for a document when the document is initially received, until the system is able to index the document using the inverted file technique. At that point, the record for the document in index 200b may be removed from index 200b.

Furthermore, elements of different implementations may be combined, deleted, added, supplemented or modified to yield further implementations. In addition, actions or communications do not necessarily need to occur in the order in which they are depicted.

Accordingly, other implementations are within the scope of the following claims.

What is claimed is:

1. A method for performing a search of documents, the method comprising:
   maintaining an index of documents, wherein the index associates each document with 0-offset N-grams contained in the document and M-offset N-grams (where M>0) contained in the document;
   receiving a query that contains at least one query string;
   determining at least one 0-offset N-gram contained in the query string and at least one M-offset N-gram (where M>0) contained in the query string;
   identifying a group of documents by using the index to determine documents that contain the 0-offset N-gram contained in the query string and the M-offset N-gram contained in the query string; and
   searching the documents in the group for the query string.

2. The method of claim 1 further comprising:
   identifying at least one document in the group that contains the query string based on searching the documents in the group for the query string; and indicating that the at least one document contains the query string.

3. The method of claim 1 wherein the index includes multiple bitmaps, wherein each bitmap represents a different document and indicates the presence of the one or more N-grams in the document represented by the bitmap.

4. The method of claim 1 wherein the index includes multiple bitmaps, wherein each bitmap represents a different N-gram and indicates different documents containing the N-gram represented by the bitmap.

5. The method of claim 1 wherein the N-grams comprise trigrams such that:
the index is a trigram index that associates each document with trigrams contained in the document;
determining at least one 0-offset N-gram contained in the query string and at least one M-offset N-gram (where M>0) contained in the query string comprises determining trigrams in the query string; and
identifying the group of documents by using the index to determine documents that contain the 0-offset N-gram contained in the query string and the M-offset N-gram contained in the query string comprises using the trigram index to determine documents that contain the trigrams in the query string.

6. The method of claim 5 further comprising:
maintaining a digram index of documents, wherein the digram index associates each document with the digrams contained in the document;
determining digrams contained in the query string;
identifying a second group of documents by using the digram index to determine documents that contain the digrams in the query string; and
searching the documents in the second group for the query string.

7. The method of claim 6 further comprising:
receiving documents;
as each document is received, determining digrams contained in the received documents;
adding one or more records to the digram index that associates each received document with the digrams in the received document;
when the number of received documents reaches a threshold, determining the trigrams contained in the received documents; and
generating the trigram index that associates each document with trigrams contained in the document based on the received documents and trigrams contained in the received documents.

8. The method of claim 1 wherein the N-grams comprise digrams such that:
the index is a digram index that associates each document with digrams contained in the document;
determining at least one 0-offset N-gram contained in the query string and at least one M-offset N-gram (where M>0) contained in the query string comprises determining digrams in the query string;
identifying the group of documents by using the index to determine documents that contain the 0-offset N-gram contained in the query string and the M-offset N-gram contained in the query string comprises using the digram index to determine documents that contain the digrams in the query string.

9. The method of claim 8 further comprising:
receiving a document;
determining digrams contained in the received document;
adding one or more records to the index that associates the received document with the digrams in the received document;
indexing the received document in a second index; and
removing the one or more records from the digram index when the document is indexed in the second index.

10. The method of claim 1 wherein the documents comprise e-mails.

11. A method for performing a search of documents, the method comprising:
maintaining an index of documents, wherein the index associates each document with N-grams contained in the document;
receiving a query that contains at least one query string;
wherein the N-grams comprise digrams such that:
the index is a digram index that associates each document with digrams contained in the document;
determining digrams in the query string;
identifying documents by using the index to determine documents that contain the N-grams in the query string, the identifying comprises using the digram index to determine documents that contain the digrams in the query string,
wherein the digrams comprise 0-offset digrams and M-offset digrams (where M>0) such that:
the digram index associates each document with 0-offset digrams and M-offset digrams contained in the document;
determining 0-offset digrams and M-offset digrams in the query string; and
using the digram index to determine a group of documents that contain the digrams in the query string comprises using the digram index to determine documents that contain the 0-offset digrams and the M-offset digrams in the query string; and
searching the documents in the group in the query string.

12. A computer-usable medium storing a computer program for performing a search of documents, the computer program comprising instructions for causing a computer to perform the following operations:
maintain an index of documents, wherein the index associates each document with O-offset N-grams contained in the document and M-offset N-grams (where M>0) contained in the document;
receive a query that contains at least one query string;
to determine N-grams contained in the query string, the computer program comprises instructions for causing a computer to determine at least one 0-offset N-gram contained in the query string and at least one M-offset N-gram (where M>0) contained in the query string;
to identify a group of documents by using, the computer program comprising instructions for causing a computer to use the index to determine documents that contain the 0-offset N-gram contained in the query string and the M-offset N-gram contained in the query string; and
search for documents in the group for the query string.

13. The medium of claim 12 wherein the computer program further comprises instructions for causing a computer to:
identify at least one document in the group that contains the query string based on searching the documents in the group for the query string; and
indicate that the at least one document contains the query string.

14. The medium of claim 12 wherein the index includes multiple bitmaps, wherein each bitmap represents a different document and indicates the presence of the one or more N-grams in the document represented by the bitmap.

15. The medium of claim 12 wherein the index includes multiple bitmaps, wherein each bitmap represents a different N-gram and indicates different documents containing the N-gram represented by the bitmap.

16. The medium of claim 12 wherein the N-grams comprise trigrams such that:

the index is a trigram index that associates each document with trigrams contained in the document;

to determine N-grams contained in the query string, the computer program comprises instructions for causing a computer to determine trigrams in the query string; and to identify documents by using the computer program comprising instructions for causing a computer to use the trigram index to determine documents that contain the trigrams in the query string.

17. The medium of claim 16 wherein the computer program further comprises instructions for causing a computer to:

maintain a digram index of documents, wherein the digram index associates each document with the digrams contained in the document;

determine digrams contained in the query string;

identify a second group of documents that potentially satisfy the query by using the digram index to determine documents that contain the digrams in the query string; and searching the documents in the second group for the query string.

18. The medium of claim 17 wherein the computer program further comprises instructions for causing a computer to:

receive documents;

as each document is received, determine digrams contained in the received documents;

add one or more records to the digram index that associates each received document with the digrams in the received document;

when the number of received documents reaches a threshold, determine the trigrams contained in the received documents; and generate the trigram index that associates each document with trigrams contained in the document based on the received documents and trigrams contained in the received documents.

19. The medium of claim 12 wherein the N-grams comprise digrams such that:

the index is a digram index that associates each document with digrams contained in the document;

to determine N-grams contained in the query string, the computer program comprises instructions for causing a computer to determine digrams in the query string;

to identify documents by using the computer program comprising instructions for causing a computer to use the digram index to determine documents that contain the digrams in the query string.

20. The medium of claim 19 wherein the computer program further comprises instructions for causing a computer to:

receive a document;

determine digrams contained in the received document;

add one or more records to the index that associates the received document with the digrams in the received document;

index the received document in a second index; and remove the one or more records from the digram index when the document is indexed in the second index.

21. The medium of claim 12 wherein the documents comprise e-mails.

22. A computer-usable medium storing a computer program for performing a search of documents, the computer program comprising instructions for causing a computer to perform the following operations:

maintain an index of documents, wherein the index associates each document with N-grams contained in the document;

receive a query that contains at least one query string;

wherein the N-rams comprise digrams such that:

the index is a digram index that associates each document with digrams contained in the document;

the computer program comprises instructions for causing a computer to determine digrams in the query string;

to identify documents by using the index to determine documents that contain the N-grams in the query string, the computer program comprises instructions for causing a computer to use the digram index to determine documents that contain the digrams in the query string, wherein the digrams comprise 0-offset digrams and M-offset digrams (where M>0) such that:

the digram index associates each document with 0-offset digrams and M-offset digrams contained in the document;

the computer program comprises instructions for causing a computer to determine 0-offset digrams and M-offset digrams in the query string;

to use the digram index to determine a group of documents that contain the digrams in the query string, the computer program comprises instructions for causing a computer to use the digram index to determine documents that contain the 0-offset digrams and the M-offset digrams in the query string; and searching the documents in the group in the query string.

* * * * *